United States Patent
Lee et al.

(10) Patent No.: US 12,221,716 B2
(45) Date of Patent: Feb. 11, 2025

(54) METHOD OF MANUFACTURING COPPER SULFATE ELECTROLYTE

(71) Applicants: KOREA ZINC CO., LTD., Seoul (KR); KZAM Corporation, Ulsan (KR)

(72) Inventors: Je Joong Lee, Seoul (KR); Gyun Hu, Ulsan (KR); Jong Hwan Yoon, Ulsan (KR)

(73) Assignees: KOREA ZINC CO., LTD., Seoul (KR); KZAM CORPORATION, Ulsan (KR)

( * ) Notice: Subject to any disclaimer, the term of this patent is extended or adjusted under 35 U.S.C. 154(b) by 0 days.

(21) Appl. No.: 18/547,654

(22) PCT Filed: Mar. 29, 2023

(86) PCT No.: PCT/KR2023/004178
§ 371 (c)(1),
(2) Date: Aug. 23, 2023

(87) PCT Pub. No.: WO2024/005307
PCT Pub. Date: Jan. 4, 2024

(65) Prior Publication Data
US 2024/0229277 A1 Jul. 11, 2024

(30) Foreign Application Priority Data
Jun. 28, 2022 (KR) ........................ 10-2022-0078819

(51) Int. Cl.
*B22F 9/08* (2006.01)
*C25D 3/38* (2006.01)

(52) U.S. Cl.
CPC ..................................... *C25D 3/38* (2013.01)

(58) Field of Classification Search
CPC ...... B22F 2009/0828; B22F 2009/0848; B22F 2009/0896; B22F 9/08; C25D 3/38; C25D 7/0614
(Continued)

(56) References Cited

U.S. PATENT DOCUMENTS

2008/0023342 A1 1/2008 Marsden et al.
2023/0256507 A1* 8/2023 Togashi ................ H01M 10/54
75/255

FOREIGN PATENT DOCUMENTS

CN 114525413 A * 5/2022 ............ C22B 11/02
JP H04209718 A 7/1992
(Continued)

OTHER PUBLICATIONS

International Search Report and Written Opinion issued for International Patent Application No. PCT/KR2023/004178, Date of mailing: Jun. 28, 2023, 7 pages.

*Primary Examiner* — Edna Wong
(74) *Attorney, Agent, or Firm* — HSML P. C.

(57) ABSTRACT

A copper sulfate electrolyte production method includes a copper melting step of producing molten copper by melting a raw material containing copper (Cu) in a melting furnace, an atomizing step of producing copper powder by spraying the molten copper with an atomizer, a leaching step of forming a copper sulfate solution by dissolving the copper powder in a leaching step input solution in a leaching reactor, a purification filtration step of removing impurities contained in the copper sulfate solution, and a conditioning step of preparing an electrolytic feed solution by mixing an electrolytic cell circulation liquid with the copper sulfate solution from which the impurities are removed in an electrolytic cell.

11 Claims, 2 Drawing Sheets

(58) Field of Classification Search
USPC ...... 75/388, 338, 331, 343; 205/76, 77, 138, 205/291
See application file for complete search history.

(56) References Cited

FOREIGN PATENT DOCUMENTS

| | | | | |
|---|---|---|---|---|
| JP | H05262523 A | | 10/1993 | |
| JP | 08141779 A | * | 6/1996 | ................ B22F 7/08 |
| JP | 2001011684 A | | 1/2001 | |
| JP | 2009035799 A | * | 2/2009 | ................ B22F 1/00 |
| JP | 2009535520 A | | 10/2009 | |
| JP | 2011032126 A | | 2/2011 | |
| JP | 2013095962 A | | 5/2013 | |
| JP | 2020084226 A | | 6/2020 | |
| JP | 2022039445 A | | 3/2022 | |
| KR | 1020020003454 A | | 1/2002 | |
| KR | 2006087374 A | * | 8/2006 | ........... C25D 17/002 |
| KR | 101043398 B1 | | 6/2011 | |
| KR | 101191715 B1 | | 10/2012 | |
| KR | 101465457 B1 | | 11/2014 | |
| KR | 101837307 B1 | | 3/2018 | |
| KR | 102476685 B1 | | 12/2022 | |
| WO | WO-9714825 A1 | * | 4/1997 | ................ C01G 3/02 |
| WO | 2007130985 A1 | | 11/2007 | |

\* cited by examiner

METHOD OF MANUFACTURING COPPER SULFATE ELECTROLYTE

TECHNICAL FIELD

The present invention relates to a copper sulfate electrolyte production method capable of easily removing impurities contained in a copper raw material and significantly improving a leaching reaction time in a leaching process. A copper sulfate electrolyte is used in the manufacture of an electrolytic copper foil.

BACKGROUND

Copper ore collected in mines is mainly used as a copper raw material in a nonferrous refining process to produce pure copper. Copper ore exist in the form of sulfide ore such as chalcocite ($Cu_2S$), chalcopyrite ($CuFeS_2$), or bornite ($Cu_5FeS_4$), or in the form of oxide ore such as cuprite ($Cu_2O$), or malachite ($Cu_2CO_3(OH)_2$). Copper ore contains a large amount of impurities. Oxide ore is soluble in dilute sulfuric acid. On the other hand, in the case of sulfide ore, iron contained together with copper is leached as ferric ions in the form of $Fe_2(SO_4)_3$ by sulfuric acid and oxygen. Then, the leached ferric ion acts as a catalyst to dissolve copper into an aqueous copper sulfate solution under an atmospheric pressure condition.

However, the copper sulfate solution, which is the filtrated leachate of copper ore also contains a large amount of impurities. Since iron ions contained in the copper sulfate solution act as a cause of significantly reducing current efficiency due to the reversible redox reaction of $Fe^{+2}/Fe^{+3}$ in an electrolysis process for obtaining a copper foil, there is a problem in that the leachate prepared in the above process cannot be directly used as an electrolyte for manufacturing an electrolytic copper foil having a thickness of several micrometers composed of 99.9% or more of pure copper. In particular, when a large amount of impurities are contained in the copper sulfate solution, these impurities are mixed into a product to reduce the purity of the product, thereby acting as a cause of reducing the performance of a secondary battery. Therefore, an impurity removal process including a complicated purification process is additionally required.

In order to solve this problem, Korean Patent Publication No. 1465457 discloses a solvent extraction method in which an organic solvent obtained by diluting 2-hydroxy-5-nonylacetophenone oxime with kerosene is used as a copper extractant when recovering copper from low grade copper oxide and copper slag by a hydrometallurgical copper recovery process. Korean Patent Publication No. 1043398 discloses a method of removing impurities through a two-step process in which copper is precipitated and separated using a zinc concentrate from a first leachate obtained by leaching copper from copper ore, and then the recovered copper precipitate is secondarily leached in a sulfuric acid solution containing iron.

In particular, in a process of manufacturing a high-purity electrolytic copper foil for a cathodic current collector of a secondary battery which is mainly used in electric vehicles, energy storage system (ESS), and mobile phones, a pure copper-type raw material is used to produce a copper sulfate electrolyte without a complicated impurity removal process. For example, a high-purity Cu Cathode (Electrolytic Copper), a waste copper foil, a waste wire (excluding sheath), a copper bar, various copper scraps, and the like are used. According to the CRC Hand Book of Chemistry and Physics, the standard reduction potential of copper is +0.34V, which is higher than that of hydrogen, i.e., 0V. Therefore, copper is classified as a noble metal and is generally not dissolved in sulfuric acid.

Korean Patent Publication No. 1837307 discloses a technique in which, in order to leach copper into copper sulfate from various raw materials containing copper in a metallic state, metallic copper dissolved into copper sulfate by adding raw materials to a reaction stock solution in which copper ($Cu^{+2}$) in a divalent oxidation state and sulfuric acid are mixed, and then aerating oxygen. According to this technique, copper ($Cu^0$) in a metallic state exposed on the surfaces of the raw materials is reacted with copper ions ($Cu^{+2}$) contained in the reaction stock solution to make monovalent oxidation state copper ($Cu^{+1}$), and is then dissolved into cupric sulfate ($CuSO_4$) using sulfuric acid.

$$Cu^0 + Cu^{+2} = 2Cu^{+1} \tag{1}$$

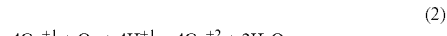
$$4Cu^{+1} + O_2 + 4H^{+1} = 4Cu^{+2} + 2H_2O \tag{2}$$

Since the efficiency of the copper leaching reaction per unit time is very low in the above reaction, it is difficult to apply the above reaction to raw materials in the form of a plate, a stick or a wire, or raw materials having a small surface area per unit weight due to problems such as the long leaching time, the increased use of oxygen, the increased use of external energy (heat source) for maintaining a reactor temperature, the increased processing cost, and the like.

Korean Patent Publication No. 1465457, etc. disclose a copper raw material pre-treatment process for shortening the leaching time, which includes a first crushing step of crushing a raw material with a jaw crusher, a second crushing step of crushing the crushed material with a hammer crusher, a sieving step of separating the crushed material of the second crushing step with a screen filter, and a tank inputting step of inputting the crushed material having a size of 2 to 10 mm on the screen filter selected in the sieving step into a leaching reactor through a belt conveyor, and inputting the crushed material having a size of less than 2 mm into a stirring tank so as to be stirred and leached. According to this process, the relatively easily crushable raw materials such as low-grade copper oxide and copper slag are used. Further, the crushed material obtained in the two-step crushing process have a wide particle size distribution. Therefore, the crushed material is sieved based on the 2 mm size. The separated crushed materials are inputted into and dissolved in different tanks. Therefore, complex processes and equipment are required.

Raw materials such as waste wires and the like can be cut into granular chopped copper with a chopping machine. However, this method also has a limit to the cutting size. Since copper is a metal with high ductility and malleability, this method cannot be applied to raw materials in the form of a plate or stick.

In view of this, Korean Patent Publication No. 1191715, etc., disclose a method in which, instead of crushing the copper raw material, a copper strip, which is a copper raw material, is made into a wave shape through oriental pressing machine and cutter in order to widen the contact area between the copper material and sulfuric acid. According to this method, the wave-shaped copper strip has peaks and troughs. The horizontal distance between the peaks and the troughs is 20 to 140 mm, and the vertical height difference between the peaks and troughs is 1 to 80 mm. A wave-shaped copper strip having a thickness of 8 mm, a width of 5 mm, a horizontal distance of 80 mm, a height difference of 25 mm, and a weight of 11.48 kg is dissolved in 121 L of 100 g/L sulfuric acid solution at 60 degrees C. for 24 hours. As a result, the dissolution rate is 4.7% (post-dissolution weight is 10.94 kg), which is higher than that of a copper sheet (2.64%) under the same conditions. However, the dissolution rate is still as low as less than 5%, and the copper concentration in the dissolved solution is also very low at a level of 4.5 g/L.

Various impurities from the outside may be contaminated in a process of peeling from a waste wire or the like and a process of transporting and distributing the peeled copper wire. In particular, components having a reduction potential greater than that of Cu, such as $Ag^+(0.80V)$, $Hg^{+2}(0.85V)$, $NO_3^{+2}(0.96V)$, $Co^{+3}(1.92V)$, and the like, are dissolved in a leaching process and are then electrolytically deposited together with copper in an electrolysis process, thereby acting as an impurity that lowers the purity of a product. Nitrate ions ($NO_3^{+2}$) may be decomposed into NOx, which is a representative environment pollutant, during an electrolysis process, and may be discharged into the atmosphere, consequently causing an environmental pollution problem.

In a method for producing a copper sulfate electrolyte by reacting metallic copper contained in a copper raw material with sulfuric acid and oxygen in a process of manufacturing an electrolytic copper or copper foil using electrolysis, the main source of sulfuric acid reuses the sulfuric acid generated in the electrolysis process. That is, by using the electrolytic drainage liquid (Cu spent) discharged from an electrolytic cell in the electrolysis process as a dissolving stock solution, it is possible to reduce the amount of new sulfuric acid supplied from the outside and prevent the loss of copper contained in the electrolytic drainage liquid.

$$\text{Anode: } H_2O + SO_4^{-2} \rightarrow 1/2 O_2 + 2H_2SO_4 + 2e^- \quad (3)$$

$$\text{Cathode: } CuSO_4 + 2e^- \rightarrow Cu + SO_4^{-2} \quad (4)$$

$$\text{Total: } CuSO_4 + H_2O \rightarrow Cu + H_2SO_4 + 1/2 O_2 \quad (5)$$

The amount of electrolytic drainage liquid used in a leaching process may be fixed by a copper concentration difference between an electrolyte in an electrolysis process and filtrated leachate in a leaching process. For example, if the concentration difference between the feed liquid and drainage liquid in the electrolysis process is 1 g/L, and if the copper concentration in the leaching process is increased by 1 g/L, the entire amount of the electrolytic drainage liquid needs to be inputted in the leaching process. As the concentration difference between the reaction stock solution and the leachate in the leaching process increases, the amount of the electrolytic drainage liquid inputted to the leaching process decreases, and the capacity of the leaching reactor and its downstream equipment also decreases. Therefore, it is possible to provide a process with excellent economic efficiency.

The concentration of copper in the leaching solution can be increased to the level of solubility of copper sulfate. However, if the leaching rate of copper in the reactor is slow, the dissolution and leaching time is very long to obtain a high-concentration copper sulfate solution. Therefore, the concentration difference has to be reduced for smooth process operation. In a conventional copper sulfate electrolyte production technique for use in manufacturing an electrolytic copper foil, copper is leached in such a way that waste wires, waste copper plates, and the like which have gone through a washing process such as water washing or acid washing are directly put into a leaching reactor without pretreatment such as crushing, pulverizing, or cutting, and then the electrolytic drainage liquid generated in tan electrolytic cell is put into the leaching reactor. Since the size of the raw material is large, the leaching reactor is operated by forcibly circulating a reaction solution using a circulation pump. Since the dissolution rate of copper is slow, the copper concentration difference between the leaching stock solution and the leached solution is as low as several g/L.

Therefore, most of the electrolytic drainage liquid has to be put into the leaching reactor. Therefore, it is required to increase the capacity of the leaching reactor increases, the number of the leaching reactor, and the capacity of auxiliary facilities such as a leachate filtration facility, an instrument for measuring concentrations of copper and sulfuric acid in the filtrated leachate, a process solution circulation pump, and the like. As a result, there are problems in that the process management is difficult, the process operating costs is increased due to an increase in process management personnel or the like, and the process management for the concentrations control of copper and sulfuric acid in each leaching reactor is difficult due to an increase in the number of reactors.

Prior Art Documents

Patent Documents

Patent Document 1: Korean Patent Publication No. 10-1465457
Patent Document 2: Korean Patent Publication No. 10-1043398
Patent Document 3: Korean Patent Publication No. 10-1837307
Patent Document 4: Korean Patent Publication No. 10-1191715

SUMMARY

It is an object of the present invention to provide a copper sulfate electrolyte production method capable of easily removing impurities contained in a copper raw material and significantly improving the leaching reaction time in a leaching process. In addition, it is an object of the present invention to provide a copper sulfate electrolyte procedure capable of improving the leaching conditions to further shorten the leaching reaction time, increasing the copper concentration in a leaching solution to enable miniaturization of an apparatus, and significantly reducing the process management costs.

The copper sulfate electrolyte procedure according to one embodiment of the present invention includes: a copper melting step of producing molten copper by melting a raw material containing copper (Cu) in a melting furnace; an atomizing step of producing copper powder by granulation of the molten copper with an atomizer; a leaching step of forming a copper sulfate solution by dissolving the copper powder in a leaching step input solution in a leaching reactor; a purification filtration step of removing impurities contained in the copper sulfate solution; and a conditioning step of preparing an electrolytic feed solution by mixing an electrolytic cell circulation liquid with the copper sulfate solution from which the impurities are removed in an electrolytic cell.

The copper concentration in the copper sulfate solution subjected to the purification filtration step is 84 g/L to 99 g/L.

The average particle size of the copper powder obtained in the atomizing step is 2 mm or less.

The atomizer includes a nozzle having a diameter of 10 mm to 15 mm.

The copper powder obtained in the atomizing step is of a spherical shape, a plate shape or a floral shape.

The atomizing step is performed by spraying high-pressure water on the molten copper injected through a nozzle.

The method further includes: a step of transferring the molten copper produced in the copper melting step to the pouring pot, wherein the pouring pot is smaller in size than the melting furnace for producing the molten copper.

The pouring pot includes a temperature maintaining device capable of maintaining the temperature of the molten copper.

In the leaching step, the copper powder put into the leaching reactor is stirred and oxidized with an agitator to form copper oxide, and the copper oxide is leached with the leaching step input solution to form the copper sulfate solution.

The electrolytic feed solution is used to manufacture a copper foil and discharged as an electrolytic drainage liquid after manufacturing the copper foil. A part of the electrolytic drainage liquid is added to the leaching step input solution, and the remaining part of the electrolytic drainage liquid is added to the electrolytic cell circulation liquid.

The part of the electrolytic drainage liquid added to the leaching step input liquid is 5 to 20% of the electrolytic drainage liquid, and the part of the electrolytic drainage liquid added to the electrolytic cell circulation liquid is 80 to 95% of the electrolytic drainage liquid.

The purification filtration step includes a purification of precipitating impurities contained in the copper sulfate solution formed in the leaching step, and a filtration step of removing the precipitated impurities.

In the copper melting step, the temperature of the molten copper is controlled to 1,150 degrees C. to 1,300 degrees C.

According to the present invention, the copper sulfate electrolyte can be prepared from the copper raw material with a simple facility and a simplified process without a complicated purification process.

In addition, by melting the copper raw material at a high temperature through the copper melting step, it is possible to effectively remove total organic carbon (TOC) and fluorine (F), which are major impurities that may affect the manufacture of the electrolytic copper foil, and increase the removal efficiency of various metal components contained in the raw material.

In addition, by making the copper molten at a high temperature into copper powder having a small particle size, it is possible to promote oxidation of the copper powder, and consequently shorten the reaction time of the copper leaching step.

In addition, by increasing the reactivity in the leaching step, it is possible to increase the concentration of the copper sulfate solution leached in the leaching step, and consequently reduce the amount of the electrolytic drainage liquid put into the leaching reactor. Therefore, it is possible to provide an economical process capable of significantly reducing the capacity of the leaching reactor, ensuring stable process management, and reducing the processing costs.

In addition, by reducing the amount of the electrolytic drainage liquid put into the leaching reactor, it is possible to minimize external contamination of the electrolytic drainage liquid.

In addition, by reducing the amount of the electrolytic drainage liquid put into the leaching reactor, it is possible to increase the input amount of the electrolyte drain put into the electrolytic cell, and consequently manufacture the copper foil with a high yield, thereby improving economic feasibility.

DETAILED DESCRIPTION

Hereinafter, an embodiment of the present disclosure will be described in detail so that those skilled in the art can easily practice them. However, the present disclosure may be embodied in many different forms and is not limited to the embodiment described herein.

Figure 1:
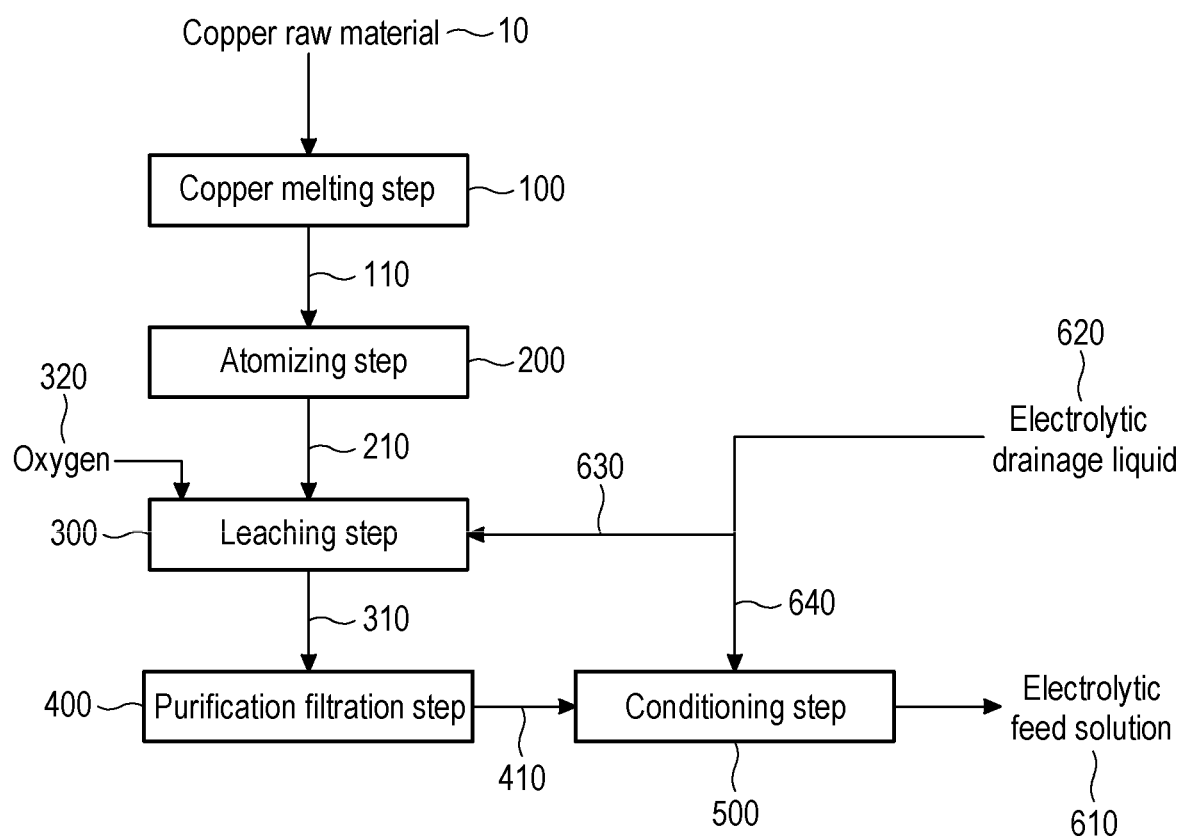
FIG. 1 is a process diagram showing a copper sulfate electrolyte production method according to an embodiment of the present invention.

FIG. 1 is a process diagram showing a copper sulfate electrolyte production method according to an embodiment of the present invention. Referring to FIG. 1, the copper sulfate electrolyte production method includes a copper melting step (100), an atomizing step (200), a leaching step (300), a purification filtration step (400), and a conditioning step (500). The copper sulfate electrolyte (electrolytic feed solution) generated through the above steps is used to manufacture an electrolytic copper foil.

A copper raw material 10 is directly put into a melting furnace without going through a pretreatment process such as water washing or drying for removing foreign substances on the surface thereof. Thus, the copper melting step 100 proceeds.

In this regard, as the copper raw material 10, it may be possible to use not only high-purity electrolytic copper, but also waste copper scraps including waste wires, waste bus-bars and waste copper strips (Cu scraps) containing metallic state copper as a main component. In addition, the raw material of a plate type, a wire type or a chipped copper type may be used without limitation in its form.

In particular, the copper raw material is characterized by being metallic state copper, but is not limited to pure copper. As the copper raw material, it may be possible to use most of metallic materials that contain precious metal elements such as gold and silver, elements which are highly volatile at high temperatures, or easily removable due to oxidation at high temperatures, such as zinc (Zn), antimony (Sb), chlorine (Cl), fluorine (F), and carbon (C), and various copper alloys. However, bronze containing a large amount of tin (Sn) is excluded from among the copper alloys.

As the melting furnace, an electric arc furnace (EAF)), an induction furnace, and the like may all be used. In particular, it is preferable to use the induction furnace in consideration of the ease of inputting raw materials, the melting time, the tapping method, the carbon dioxide generation amount, the environmental friendliness, and the like.

In the copper melting step 100, the copper raw material 10 may be melted to produce molten copper having a temperature of 1,150 degrees C. to 1,300 degrees C. When the temperature of the molten copper exceeds 1,300 degrees C., the molten copper reacts with oxygen in the air to accelerate the formation of copper oxide, thereby increasing the amount of dross. When the temperature of the molten copper is less than 1,150 degrees C., the fluidity of the molten copper is reduced during tapping, and nozzle clogging may occur in the atomizing step.

Zinc, lead, chlorine, fluorine, etc. are removed as dust in the copper melting step, and total organic carbon (TOC) from lubricating oil, insulator, grease, or the like is oxidized into carbon dioxide in the copper melting step and then discharged to the atmosphere. Therefore, the copper melting step 100 can obtain the effect of melting copper and primarily purifying various impurities. The molten copper 110 produced through the copper melting step 100 in the melting furnace is quickly tapped into an atomizer.

The atomizing step 200 may use both pyrometallurgical process using high-pressure air injection and a hydrometallurgical process using high-pressure water. Preferably, the hydrometallurgical process using high-pressure water may be used in view of a method of effectively removing the residual heat of copper powder and treating an exhaust gas when recovering the copper powder generated in the atomizing step.

The atomizing step 200 is performed by spraying high-pressure water onto the molten copper injected through a nozzle of an atomizer. Copper powder is produced through the atomizing step.

Since the particle size of the copper powder to be produced is determined by the diameter of the injection nozzle, the diameter of the injection nozzle may vary depending on the particle size of the copper powder to be produced.

In the present invention, the diameter of the injection nozzle may be controlled in the range of about 8 mm to 20 mm. If the diameter of the injection nozzle is smaller than 8 mm, nozzle clogging increases due to the decrease in fluidity of the molten copper during the atomizing step 200. If the diameter of the injection nozzle is larger than 20 mm, copper powder having a large size is obtained.

In addition, in order to obtain copper powder 210 having an average particle size of 2 mm or less, the diameter of the injection nozzle may be set to about 10 mm to 15 mm. In order to improve the reaction rate by dispersing the copper powder 210 throughout the leaching reactor by an agitator used in the leaching step 300 described later, and improve the reaction efficiency of oxygen by increasing the retention time of the copper powder 210 in the reaction solution, it is preferable for the copper powder 210 to have an average particle size of 2 mm or less so that the individual weight of the copper powder 210 is not large.

The copper powder 210 obtained in the atomizing step 200 may have a spherical shape, a plate shape, or a floral shape, preferably a plate shape or a floral shape. Unlike the general plate shape, which has a flat surface, the floral shape has a corrugated surface just like petals, and has a larger surface area than the general plate shape. Since the plate shape or floral shape powder has a larger surface area than the general ball shape powder, it can increase the surface area in which the copper powder 210 and oxygen are in contact with each other in the leaching step 300. The shape of the powder is determined by the injection speed and pressure of high-pressure water, the injection angle of high-pressure water, the input speed of molten copper through the nozzle, and the like.

The copper powder 210 produced in the atomizing step 200 is put into the leaching reactor in the leaching step 300.

When the copper powder put into the leaching reactor is stirred with an agitator while adding oxygen 320 to the copper powder, the oxygen reacts with the surface of the copper powder having a very large surface area per unit weight to form copper oxide. The copper oxide thus formed is leached by the leaching step input solution 630, which is a mixed solution of copper sulfate and sulfuric acid, thereby forming a high-concentration copper sulfate solution.

A reaction in which copper powder is oxidized by oxygen to form cupric oxide and a reaction in which cupric oxide is leached by the leaching step input solution 630 are represented by the following chemical formula.

$$Cu + 1/2O_2 \rightarrow CuO \tag{6}$$

$$CuO + H_2SO_4 \rightarrow CuSO_4 + H_2O \tag{7}$$

The agitator that stirs the copper powder in the leaching reactor can not only improve the reaction rate by dispersing the solid copper powder having a large specific gravity throughout the leaching reactor and improving the number of collisions between the solid and the liquid, but also increase the retention time of oxygen in the reaction solution by causing the oxygen put into the leaching reactor to become fine bubbles. Accordingly, the reaction efficiency between copper powder and oxygen is improved, and the loss of oxygen is minimized, thereby reducing process management costs.

Next, the leachate 310 obtained in the leaching step 300 is prepared as a mother solution of copper sulfate electrolyte through the purification filtration step 400.

In the purification filtration step 400, a small amount of purification residue is generated in the process of precipitating and removing a trace amount of impurities contained in the leachate 310. The purification residue is removed through a filtration facility.

Various impurities introduced from the copper raw material are distributed to the purification residue solid-liquid-separated in the filtration facility and then taken out of the processing solution. The filtrate 410 is a mother solution of a copper sulfate electrolyte for manufacturing a copper foil and is fed to the conditioning step 500.

The conditioning step 500 is a step of preparing an electrolytic feed solution 610, which is a copper sulfate electrolyte supplied to an electrolytic cell for manufacturing a copper foil. The electrolytic feed solution 610 is used to manufacture a copper foil. Apart of an electrolytic drainage liquid 620 generated after the manufacture of a copper foil is recycled to the electrolytic cell as an electrolytic cell circulation liquid 640 and used in the conditioning step 500. The remaining part of the electrolytic drainage liquid 620 is inputted to the leaching step 300 as a leaching step input solution 630 and used for leaching the copper powder 210.

According to the present invention, the reaction time in the leaching step 300 for preparing a copper sulfate solution can be remarkably lowered due to the large surface area of the copper powder by the atomizing step 200. Therefore, even at the same reaction time, it is possible to improve the copper concentration in the leachate 310, which is a copper sulfate solution, and the copper concentration in the filtrate 410.

In the present invention, the copper concentration in the filtrate 410 after passing through the atomizing step 200, the leaching step 300, and the purification filtration step 400 may be 84 g/L to 99 g/L. As the copper concentration in the filtrate 410 is improved as described above, unlike the conventional technique in which the entire amount of the electrolytic drainage liquid 620 discharged the manufacture of the electrolytic copper foil in the electrolytic cell is inputted into the leaching reactor, only about 5 to 20% of the amount of the electrolytic drainage liquid 620 may be inputted into the leaching reactor as the leaching step input solution 630, and about 80 to 95% of the amount of the electrolytic drainage liquid 620 may be reused as the electrolytic cell circulation liquid 640.

As the electrolytic drainage liquid 620 is exposed to the outside of the electrolytic cell, the possibility of contamination increases. According to the present invention, only a small amount of the electrolytic drainage liquid is fed and circulated to the leaching reactor. This makes it possible to minimize external contamination of the copper sulfate electrolyte. In addition, the capacities of facilities related to the leaching reactor, such as the capacity of the leaching reactor, the capacity of the pump for feeding the electrolytic drainage liquid 620 to the leaching reactor, and the like, can be significantly reduced as compared with those of the related art.

Figure 2:
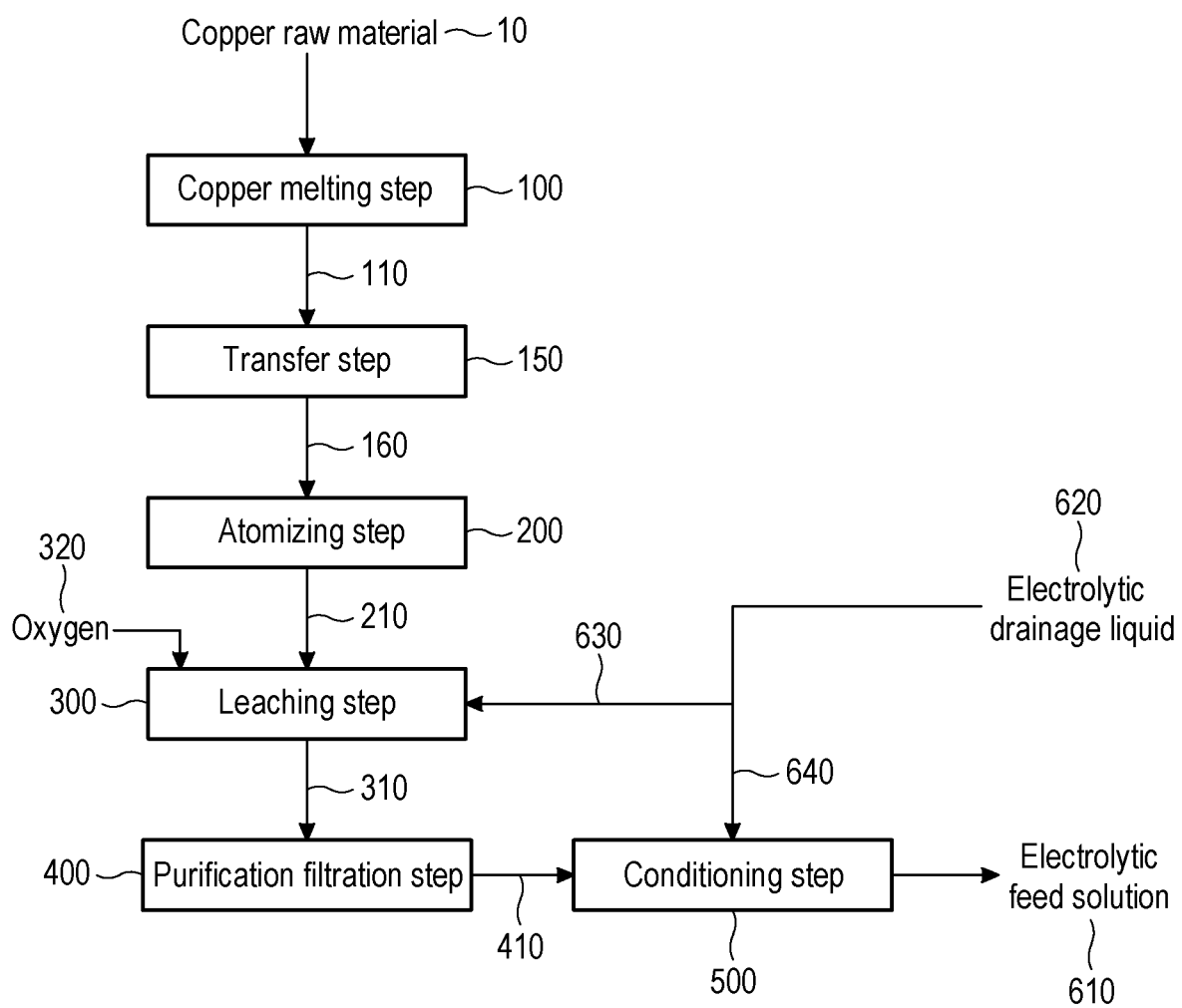
FIG. 2 is a process diagram showing a copper sulfate electrolyte production method according to another embodiment of the present invention.

FIG. 2 is a process diagram showing a copper sulfate electrolyte production method according to another embodiment of the present invention.

The copper sulfate electrolyte production method according to another embodiment of the present invention may further include a transfer step 150 of transferring the molten copper 110 produced in the copper melting step 100 to a separate pouring pot between the copper melting step and the atomizing step. The pouring pot is smaller in size than the melting furnace for producing the molten copper 110 in the copper melting step.

As described above with reference to FIG. 1, the copper powder may be produced through the atomizing step 200 by directly inputting the molten copper 110 produced in the melting furnace into the atomizer. For the reduction of the operation time, the improvement of the efficiency of the melting furnace operation, the continuous operation of the atomizer facilities, the miniaturization of each facility, and the like, the transfer step 150 may be added between the copper melting step 100 and the atomizing step 200.

Specifically, the molten copper 110 transferred to the tundish contains a dross in which impurities and oxides are concentrated. In this case, by using a smaller pouring pot than the melting furnace, it is possible to easily remove a layer-separated dross from the top of the pouring pot. In order to smoothly separate the layers of the molten copper 110 and the dross and prevent the decrease in fluidity due to the cooling of the molten copper 110 in the pouring pot, the pouring pot may include a temperature maintaining device capable of maintaining the temperature of the molten copper 110. The temperature maintaining device such as an electric furnace type, an induction furnace type, and a heating torch type may be used without limitation. The dross can be easily removed from the molten copper 110 through the transfer step 150, which makes it possible to enhance the leaching efficiency in the leaching step 300.

The molten copper 160 from which the dross is removed through the transfer step 150 is rapidly tapped to the atomizer and used in the atomizing step.

In addition to the transfer step 150 described above, the copper melting step 100, the atomizing step 200, the leaching step 300, the purification filtration step 400, and the conditioning step 500 are the same as those described above with reference to FIG. 1. Therefore, the description thereof will be omitted.

According to the present invention including the steps described above, by melting the copper raw material at a high temperature, it is possible to effectively remove total organic carbon (TOC) and fluorine (F), which are major impurities that may affect the manufacture of the electrolytic copper foil, and increase the removal efficiency of various metal components contained in the raw material.

In addition, according to the present invention, by making the copper molten at a high temperature into copper powder having a wide surface area and a small particle size using the hydrometallurgical process, it is possible to shorten the reaction time in the copper leaching step, significantly reduce the capacity of the leaching reactor, ensure stable process management, and reduce the processing costs.

Those skilled in the art will understand that the present invention may be embodied in other specific forms without changing its technical spirit or essential features. Therefore, the embodiments described above are exemplary in all respects and should not be construed as being limitative. The scope of the present invention is defined by the appended claims. All changes or modifications derived from the meaning and scope of the claims and equivalent concepts thereof should be construed as being included in the scope of the present invention.

What is claimed is:

1. A copper sulfate electrolyte production method, comprising:
    melting a raw material containing copper (Cu) in a melting furnace to produce molten copper;
    spraying the molten copper with an atomizer to produce copper powder;
    dissolving the copper powder in an input solution in a leaching reactor to form a copper sulfate solution;
    removing impurities from the copper sulfate solution; and
    mixing an electrolytic cell circulation liquid with the copper sulfate solution from which the impurities are removed in an electrolytic cell to prepare an electrolytic feed solution,
    wherein an average particle size of the produced copper powder is 2 mm, and
    wherein the produced copper powder is of a plate shape or a floral shape.

2. The method of claim 1, wherein the atomizer includes a nozzle having a diameter of 10 mm to 15 mm.

3. The method of claim 1, wherein the spraying includes spraying high-pressure water on the molten copper injected through a nozzle.

4. The method of claim 1, further comprising:
    transferring the produced molten copper to a pouring pot, wherein the pouring pot is smaller than the melting furnace.

5. The method of claim 4, wherein the pouring pot includes a temperature maintaining device configured to maintain a temperature of the molten copper.

6. The method of claim 1, wherein the dissolving comprises:
    stirring and oxidizing the produced copper powder in the leaching reactor with an agitator to form copper oxide, and
    leaching the copper oxide with the input solution to form the copper sulfate solution.

7. The method of claim 1, wherein a copper concentration in the copper sulfate solution from which impurities are removed is 84 g/L to 99 g/L.

8. The method of claim 7, wherein
the electrolytic feed solution is used to manufacture a copper foil and is discharged as an electrolytic drainage liquid after manufacturing the copper foil, and
a part of the electrolytic drainage liquid is added to the input solution, and
another part of the electrolytic drainage liquid is added to the electrolytic cell circulation liquid.

9. The method of claim 8, wherein
the part of the electrolytic drainage liquid added to the input solution is 5 to 20% of the electrolytic drainage liquid, and
the another part of the electrolytic drainage liquid added to the electrolytic cell circulation liquid is 80 to 95% of the electrolytic drainage liquid.

10. The method of claim 1, wherein the removing of impurities from the copper sulfate solution comprises:
precipitating impurities contained in the copper sulfate solution formed in the dissolving of the copper powder, and
removing the precipitated impurities.

11. The method of claim 1, wherein in the melting of the raw material containing copper (Cu), the produced molten copper is controlled to a temperature of 1,150 degrees C. to 1,300 degrees C.

* * * * *